April 2, 1968  R. A. TIDBALL  3,376,204
NON-SCALING HIGH TEMPERATURE SEA WATER DISTILLATION UNIT
Filed Sept. 14, 1964
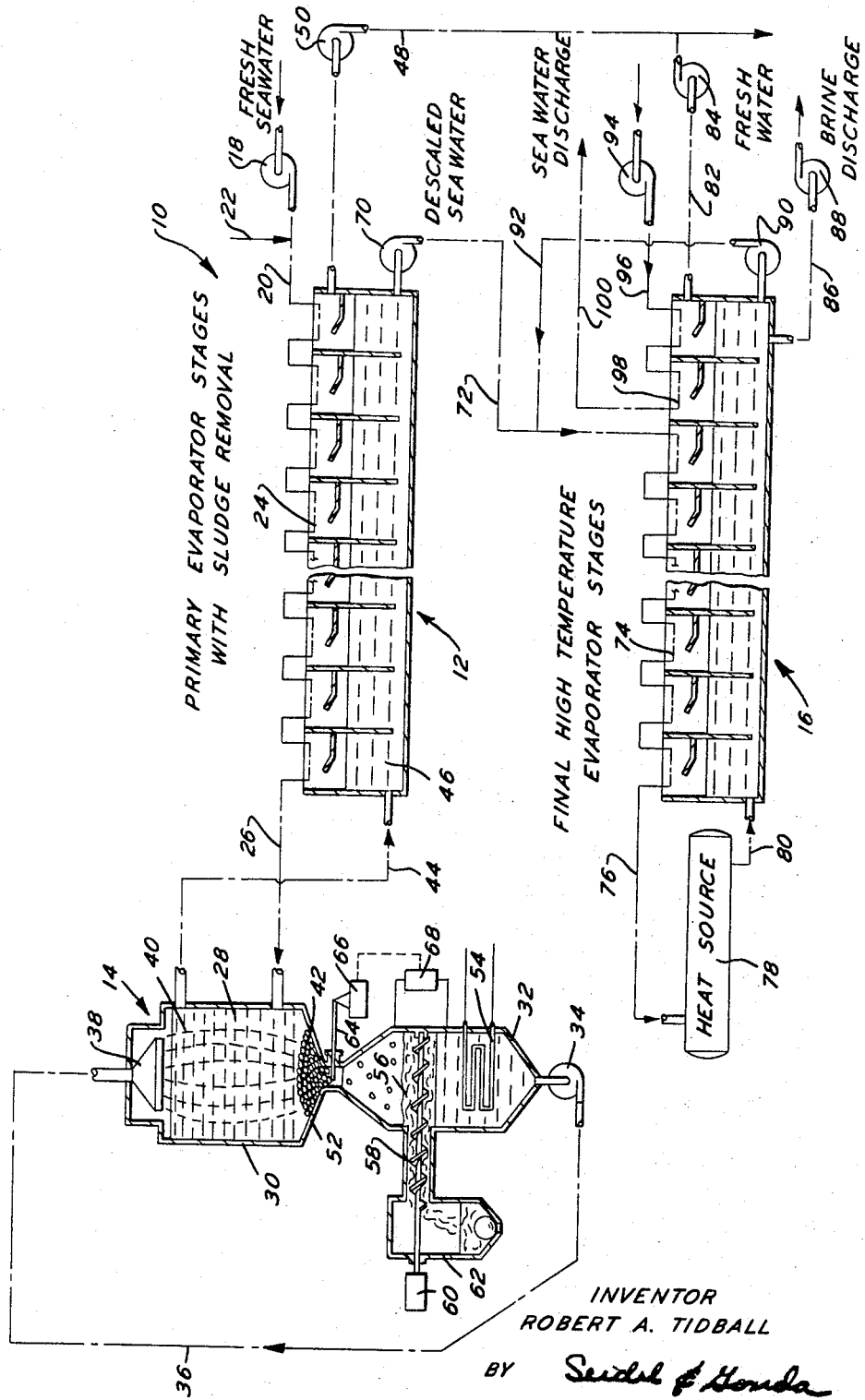
INVENTOR
ROBERT A. TIDBALL
BY Seidel & Gonda
ATTORNEYS.

United States Patent Office 3,376,204
Patented Apr. 2, 1968

3,376,204
NON-SCALING HIGH TEMPERATURE SEA WATER DISTILLATION UNIT
Robert A. Tidball, Swarthmore, Pa., assignor, by mesne assignments, to Baldwin-Lima-Hamilton Corporation, Philadelphia, Pa., a corporation of Delaware
Continuation-in-part of application Ser. No. 362,602, Apr. 27, 1964. This application Sept. 14, 1964, Ser. No. 396,343
7 Claims. (Cl. 203—7)

ABSTRACT OF THE DISCLOSURE

A method for distilling sea water at high temperature, and a non-scaling apparatus wherein the method may be performed, the apparatus comprising a primary multistage flash distilling plant wherein substantially all scale-forming constituents are removed from the sea water and wherein a portion of the descaled sea water is flashed to form a fresh water distillate, and a secondary multistage flash distilling plant wherein the portion of the descaled sea water not flashed in the primary distilling plant is reheated to a temperature in excess of the temperature at which scale-forming constituents precipitate from fresh sea water, and a portion thereof flashed to form a further fresh water distillate.

---

This invention relates to a method and apparatus for recovering potable water from sea water.

This application comprises a continuation-in-part of my copending application Ser. No. 362,602, filed Apr. 27, 1964, entitled "Sea Water Heater With Scale Removing Features."

A serious problem has arisen in recent times regarding the adequacy of present fresh water supplies. Due to increasing world population, extensive irrigation projects, etc., the present supply of available fresh water is falling below the growing demand. A virtually untapped source of fresh water, the earth's oceans, can be drawn upon to fill the demand. However, large scale conversion of sea water to fresh water, to date, has been impractical and commercially unfeasible. The main difficulties in present day conversion techniques of sea water to fresh water involves the scaling, foaming, corrosion, etc., accompanying conventional multistage flash distilling plant operation.

Because of the fact that the scaling salts found in sea water will only precipitate out of the sea water above certain temperatures, one proposed solution has been to maintain the temperature of the sea water in the distilling plant below these critical precipitating temperatures. However, this will result in a loss of thermal energy available to heat the fresh brine being introduced into the distilling plant and decreases the flashing rate in each flash chamber thereby resulting in an inefficient and costly operation.

One of the most economical methods of developing sufficient energy to make potable water from sea water in a multistage flash distilling plant is to raise the temperature of the sea water entering the first stage of the plant as high as feasible. However, as previously stated, several of the salts present in sea water are less soluble in hot sea water than in cold sea water. These salts include calcium carbonate, magnesium hydroxide, and calcium sulfate. Hence, if the sea water inlet temperature to the multistage flash distilling plant is raised too high, some of these salts will begin precipitating and form scale on the condensers and walls of each flash chamber.

Untreated sea water can be heated to approximately 165° F. without the initiation of rapid scaling, and unconcentrated sea water to as high as 300° F. for a few seconds without the appearance of calcium sulfate scale. To date, chemical treatment systems have been developed to increase the upper temperature limits in practical plants to 250° F. For example, it has been found that by inserting seed crystals of the scaling salts in the flowing brine stream, the salts which precipitate as the brine is heated can be made to grow on the seed crystals rather than on the condenser tube walls and on the walls of the flash chambers. The precipitate is removed from the brine overboard stream and a portion returned to a brine recycle stream to maintain a continuing scale retarding system.

In the known seeding method described above the calcium sulfate precipitate will grow on the calcium sulfate crystals. However, a portion of the precipitated calcium sulfate will redissolve as the brine is cooled below 250° F. in the flash chambers of the distilling plant. This will prevent removal of a controlled amount of the precipitant in the brine overboard stream, and leads to concentration of the scaling salts in the brine recycle stream. Thus, at temperatures above 250° F., calcium sulfate will precipitate from the sea water in known recycle plants.

This invention relates to a sea water distilling plant which can be operated at temperatures well in excess of 250° F. This invention provides an apparatus and method for removing the scaling constituents from the sea water prior to its disposal within the flash chambers of the distilling plant. Since the scaling problem is virtually eliminated by the present invention, the sea water may enter the first stage of a multistage flash distilling plant at as high a temperature as is economically feasible. This invention specifically overcomes the temperature limitations placed on prior methods and apparatus for distilling sea water.

Accordingly, it is an object of this invention to provide a non-scaling high temperature sea water distillation unit.

A further object of this invention is to provide a sea water distillation unit with means for removing the scaling constituents from fresh sea water prior to the introduction of the sea water into the flash chambers of the distillation unit.

Another object of this invention is to provide a high temperature sea water distillation unit which is adapted to distill sea water whose scaling salts or constituents have been removed.

A still further object of this invention is to provide an apparatus and method for distilling sea water at temperatures in excess of that at which the scaling constituents in fresh sea water will precipitate.

Other objects will appear from the disclosure which follows hereinafter.

For the purpose of illustrating the invention, there is shown in the drawings a form which is presently preferred; it being understood, however, that this invention is not limited to the precise arrangement and instrumentalities.

The single figure in the drawing is a diagrammatic view of the non-scaling high temperature sea water distillation unit comprising the subject matter of the instant invention.

Referring now to the drawing in detail, wherein like numerals indicate like elements, the distilling unit of the present invention is generally designated by the numeral 10.

The distillation unit 10 includes a primary distillation plant 12, having a sea water heater 14 with scale removing features, as per my copending application Ser. No. 362,602, and a final high temperature distillation plant generally designated by the numeral 16.

Fresh sea water is pumped by a pump 18 through a fresh sea water inlet line 20 to the primary distillation plant 12. Sea water or brine 28, passes through the condensers 24 in each stage of the multistage flash distilling plant 12. The condensers will heat the brine 28, thereby reducing the heat input required in the sea water heater 14. The brine 28 passes from the condenser in the first stage 46 of the distillation plant 12 into the heating chamber 30 of the heater 14.

The maximum temperature to which the brine 28 can normally be heated in the distilling plant 12 is severely limited because above certain temperatures, the scaling constituents in the brine will begin to precipitate out on the condensers and the walls of each flash chamber. The heater 14 is used to further increase the temperature of the brine and to remove the scaling constituents in the brine before the brine is sent into the first flash chamber.

The brine heater 14 includes a molten metal reservoir 32 below the heating chamber 30. A conduit 36 extends from the reservoir 32 of molten metal into the top of the heating chamber 30. The conduit 36 terminates in an elongated spray head 38 above the brine level within the vessel 30. The temperature of the upflowing brine 28 within the vessel 30 is maintained below the melting point of the molten metal pumped through the conduit 36 by a pump 34 from the reservoir 32. The spray head 38 will distribute the molten metal in a plurality of distributed spray streams 40 into the brine 28. Since the temperature of the brine is below the melting point of the molten metal, it will solidify upon contact with the brine.

As the molten metal falls through the brine 28 it will solidify into small shot or globules 42. In solidifying, the metal will not only give up its own heat to the brine 28, but will transfer its latent heat of solidification to the brine solution, thereby reducing the molten metal flow below that required for a circulatory liquid or solid shot to achieve the same heating effect. The brine 28 is heated in the vessel to a temperature of about 275° F. or higher.

The heated brine passes into a conduit 44, and into the first stage flash chamber 46 of the multistage flash distilling plant 12. A portion of the heated brine is flashed into vapor and heats the fresh sea water flowing through the associated condenser 24, is condensed and taken out of the stage as distillate. The remainder of the heated brine flows into the next stage and is further distilled in conventional fashion. The distillate from all stages is collected as fresh water and removed by a pump 50 through a fresh water distillate discharge line 48.

As discussed previously, the principal scaling salts in sea water are calcium carbonate, calcium sulfate, and magnesium hydroxide. At temperatures above 250° F. all of these scaling salts will precipitate from the sea water. The precipitated salts normally form scale on the flash chamber walls, the condenser tubes, and the brine heater tubes. However, this scaling problem is virtually eliminated by the formation of the solid metal shots 42 within the brine heater 14.

Since the solid shots and liquid droplets entering the brine 28 are at a higher temperature than the brine and the vessel walls, the scaling constituents within the brine will precipitate and cling to the metal shots falling through the brine. The metal shot on which the scaling salts precipitate and cling are collected in a hopper 52 at the bottom of the brine heater vessel 30.

From the hopper 52 the shot and clinging scaling salts are allowed to fall into the molten metal reservoir 32. Disposed within the reservoir 32 is a heat exchanger 54. The heat exchanger may be of any conventional type. The metal shot is remelted within the reservoir 32 by the heat exchanger 54. During the melting of the shot, the scale breaks free and since it is less dense than the molten metal, it forms a separate layer 56 above the remelted metal. A screw conveyor 58 driven by a motor unit 60 connected to the conveyor is adapted to remove the scale 56 into a scale receiving vessel 62. The collected scale may then be removed from the apparatus.

The remelted solid metal shot is then recirculated by means of the pump 34 to the sprayhead 38.

A gate 64 may be slidably disposed in the connecting throat between the hopper 52 and the reservoir 32. This gate is slid by means of a crank unit 66 whose movement is controlled by a liquid level sensing device such as 68 which senses the level of the liquid metal within the reservoir 32. The level control 68 may be of the float valve type or any other conventional equipment. By means of the gate 64 and the level control 68, the molten metal level may be maintained below the scale removing conveyor 58.

It will thus be apparent that the sea water which enters the flash chamber of the multistage flash distilling plant 12 is substantially free of scale. The descaled brine is not discharged back to the sea water source, but is rather pumped by a pump 70 to a second multistage flash distilling plant 16 in which it is used as the makeup to the conventional recycle system of distilling plant 16.

The descaled sea water enters the inlet conduit 72 through the distilling plant 16 and is reheated by being passed through the condenser 74 of the distilling plant 16. The reheated brine is then passed through a conduit 76 into another heater 78 wherein it is heated to whatever the maximum economical temperature can be used with each of the flash chambers in the distilling plant 16. Since the brine within the distilling plant 16 is substantially free of scaling constituents, the scaling problem inherent heretofore with high temperature sea water distillation apparatus is substantially eliminated. The brine may therefore be heated by heater 78 to temperatures in excess of the temperature at which scaling constituents precipitate from fresh sea water, thereby maximizing yield of distillate and thermodynamic efficientcy. For example, the descaled brine may be re-heated without scaling to temperature in excess of 300° F.

The heated descaled brine is conducted from the heater 78 through a conduit 80 into the first stage flash chamber of the distillation plant 16. A portion of the brine is flashed in each stage and the fresh water distillate is removed through a distillate line 82 by means of a pump 84 and joints the distillate from the distillation plant 12.

A portion of the distilled brine is pumped by means of a pump 88 through a brine discharge line 86 and discharged overboard. The remaining brine within the last flash stage of the distillation plant 16 is recycled by means of a pump 90 through a conduit 92 to the sea water inlet line 72. The brine from distilling plant 12 is used as the sea water makeup replacing the brine that has been flashed and the brine that has been discharged to maintain the desired salinity in the recycle stream of distilling plant 16.

It should be noted that recycled brine and descaled sea water enters the third from the last stage of the distillation plant 16. Use of the last stages as heat rejection stages is necessary to control the temperature level of the entire distilling plant 16.

Accordingly, the brine inlet to the distillation plant 16 is in the third stage from the end. Fresh sea water is pumped by means of a controlled delivery pump 94 through a brine inlet line 96 and the condensers 98 in the last and next to the last stage of the distillation plant 16. This fresh sea water is then discharged overboard through a discharge line 100. Therefore, since the fresh sea water has a temperature below that of brine within the last two stages of the distillation plant 16, a distilled product can be recovered.

If desired, other scale control systems may be used with either the brine heater 14 or with conventional shell and tube heat exchangers as brine heaters.

One such system would be the use of a seeding technique which would allow the scaling salts to grow on the seed crystals rather than on the tube walls. The seed crystals could be introduced into the fresh sea water either through a conduit 22 or in the condenser system at any temperature below 150° F. These crystals would then be carried with the sea water through the higher temperature condenser sections and through the brine heater. The brine heater could be either a conventional heat exchanger or a molten metal heater such as 14.

At temperatures above 250° F. various forms of calcium sulfate are precipitated from the brine. Magnesium hydroxide and calcium carbonate precipitate at temperatures within the range of 155° F.–250° F. It has been found that the precipitating crystals of calcium sulfate, as well as those of magnesium hydroxide and calcium carbonate cling to the seed crystals placed in the brine stream, rather than setting on the condenser tubes 24 within the plant 12. However, the precipitated calcium sulfate has been found to redissolve as the brine is cooled below 250° F. in the flash chamber of the plant 12.

Therefore, additional steps must be taken to assure that the calcium sulfate crystals are removed from the brine before the brine is cooled in the flash chambers. One such method is a filtering system as disclosed in copending application Ser. No. 368,118 in the name of R. A. Tidball et al., filed May 18, 1964, and assigned to the same assignee as the present invention.

Where it is desirable to heat the incoming sea water in distilling plant 12 to temperatures above 165° F. at the outlet of the first stage or in conduit 26, some form of scale retardant is required. In lieu of the seeding technique described above, other chemical feed treatments well known to those skilled in the art could be used to prevent scaling in the sea water to temperatures of 250° F. The precipitants above 250° F. could be removed by the filtering system described above or in brine heater 14.

It will thus be apparent that a non-scaling high temperature sea water distillation unit has been provided. The unit enables the brine to be heated to as maximum a temperature as possible thereby providing the necessary thermal energy in the most economical fashion to carry out the distillation process.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for distilling sea water comprising a first multistage flash distilling plant adapted to receive fresh sea water to be distilled, said plant including means for heating sea water to a temperature at which substantially all the scaling constituents in said sea water precipitate said means for heating sea water including, means for separating precipitated scaling constituents from said sea water before they can redissolve, a plurality of flash chambers in said distilling plant for flashing said sea water to form a fresh water distillate, conduit means for receiving heated and descaled sea water and removing said heated and descaled fresh sea water distillate from said first plant, discharge conduit means for removing non-distilled sea water from said first plant, a second multistage flash distilling plant, said second plant including conduit means communicating with the non-distilled sea water discharge conduit means in said first plant, means in communication with said non-distilled sea water discharge conduit means in said first plant for heating said non-distilled sea water from said first plant to a temperature in excess of temperatures at which the scaling constituents in fresh sea water will precipitate, a plurality of flash chambers in said second distilling plant for receiving heated and descaled sea water and flashing said non-distilled sea water to form a fresh water distillate, conduit means for removing said fresh water distillate from said second plant, said first plant being of the once-through type, and said second plant including means for recycling at least a portion of the unflashed sea water therein to its flash chambers for further flashing.

2. A method for distilling sea water comprising the steps of passing the fresh sea water through a first multistage flash distilling plant, removing substantially all of the scaling constituents from said sea water as it passes through said plant, flashing some of said descaled sea water to form a fresh water distillate in said first plant, passing the remaining descaled sea water to a second multistage flash distilling plant, reheating said descaled sea water in said second multistage flash distilling plant to a temperature in excess of the temperature at which scaling constituents precipitate from fresh sea water, flashing some of said descaled sea water to form a fresh water distillate in said second plant, and collecting said distillates.

3. A method for distilling sea water comprising the steps of heating fresh sea water in a heater to a temperature at which the scaling constituents in said sea water precipitate, collecting the precipitated scaling constituents, separating said precipitated scaling constituents from said sea water, introducing said heated and descaled sea water into the flash chambers of a first multistage flash distilling plant, flashing some of said descaled sea water to form a fresh water distillate in said first plant, reheating the remaining descaled sea water to a temperature in excess of that at which scaling constituents of fresh sea water precipitate, passing the remaining descaled sea water through the flash chambers of a second multistage flash distilling plant, thereby causing some of the descaled sea water to flash and form a fresh water distillate in said second plant, and collecting said distillates.

4. A method for distilling sea water comprising the steps of heating fresh sea water to a temperature at which substantially all the scaling constituents in said sea water will precipitate, separating the precipitated scaling constituents from said sea water before they can redissolve in said sea water, passing said descaled sea water successively through the flash chambers of a first multistage flash distilling plant, thereby causing some of said descaled sea water to flash to form a fresh water distillate, reheating the remaining portion of said descaled sea water to a temperature in excess of that at which the scaling constituents in fresh sea water will precipitate, passing said descaled and reheated sea water successively through the flash chambers of a second multistage flash distilling plant, thereby causing some of said reheated and descaled sea water to flash and form a fresh water distillate in said second distilling plant, and collecting said distillate.

5. A method for distilling sea water comprising the steps of preheating fresh sea water by passing it through the flash chambers of a first multistage flash distilling plant as a condensing medium, heating a transfer medium in a portion of said first plant distinct from the flash chambers of said plant to a temperature above its melting point, distributing the heated medium as a spray over a pool of said preheated sea water maintained at a temperature below the melting point of said medium, cooling and solidifying said medium as it falls through said pool thereby causing it to give up some of its sensible heat and all of its latent heat of solidification to heat the pool and causing substantially all the scaling constituents in said sea water pool to precipitate and to adhere to said solidified heat transfer medium as said solidified heat transfer medium continues to fall through said pool, collecting and separating said solidified heat transfer medium and clinging scale constituents from said descaled sea water in said portion of said first plant, flashing some of the descaled sea water in the flash chambers of said first plant to form a fresh water distillate, passing the remaining descaled sea water to a second multistage flash distilling plant, reheating said remaining descaled sea water by passing it through flash chambers of said second multistage distilling plant as a condensing medium, further reheating said remaining descaled sea water in a heater portion of said second multistage distilling plant to a temperature in excess of that at which the scaling constituents in fresh sea water would precipitate, flashing some of the descaled sea water in the flash chambers of said second plant to form a fresh water distillate in said second plant, and collecting said distillates.

6. A method for distilling sea water comprising the steps of introducing into fresh sea water, crystals of the scaling constituents within said sea water, progressively preheating and passing said fresh sea water and crystals as a condensing medium through flash chambers of a first multistage flash distilling plant, heating a transfer medium in a portion of said plant distinct from the flash chambers of said plant to a temperature above its melting point, distributing the heated medium as a spray over a pool of said preheated sea water and crystals maintained at a temperature below the melting point of said medium but above the scale precipitating temperature of the sea water, cooling and solidifying said medium as it falls through said pool, thereby causing it to give up some of its sensible heat and all of its latent heat of solidification to heat the pool and causing substantially all the scaling constituents in said sea water pool to precipitate as said solidified heat transfer medium continues to fall through said pool, some of said precipitated scaling constituents adhering to said solidified medium and some to said crystals, collecting said solidified heat transfer medium and said crystals with their clinging scale constituents and separating said solidified medium, crystals and scale constituents from said sea water before the constituents can redissolve in said sea water, flashing some of said descaled sea water in said plant to form a fresh water distillate, passing the remaining descaled sea water as a condensing medium through flash chambers of the second multistage flash distilling plant, reheating said remaining descaled sea water in a portion of said second plant distinct from said flash chambers to a temperature in excess of that at which the scaling constituents in fresh sea water would precipitate, and thereafter flashing some of the descaled sea water in the flash chambers of said second plant to form a fresh water distillate in said second plant and collecting said distillates.

7. Apparatus for distilling sea water comprising a first multistage flash distilling plant adapted to receive fresh sea water to be distilled, said plant including means for heating sea water to a temperature at which substantially all the scaling constituents of said sea water precipitates, said means for heating sea water including means for separating precipitated scaling constituents from said sea water before they can redissolve, a plurality of flash chambers in said distilling plant for receiving said heated and descaled sea water and flashing said heated and descaled sea water to form a fresh water distillate, conduit means for removing said distillate from said first plant, discharge conduit means for removing non-distilled sea water from said first plant, a second multistage flash distilling plant, said second plant including conduit means communicating with the non-distilled sea water discharge conduit means in said first plant, means in communication with said non-distilled sea water discharge conduit means in said first plant for heating said non-distilled sea water from said first plant to a temperature in excess of temperatures at which the scaling constitutents in fresh sea water will precipitate, a plurality of flash chambers in said second distilling plant for receiving said heated and descaled sea water and flashing said sea water to form a second fresh water distillate, and conduit means for removing said fresh water distillate from said second plant.

References Cited

UNITED STATES PATENTS

| | | | |
|---|---|---|---|
| 2,631,835 | 3/1953 | Jones | 203—19 |
| 2,856,074 | 10/1958 | Dubitzky | 210—175 |
| 2,979,442 | 4/1961 | Badger | 202—174 X |
| 3,032,482 | 5/1962 | Shoemaker | 203—100 |
| 3,119,752 | 1/1964 | Checkovich | 203—11 |
| 3,135,670 | 6/1964 | Ristaino et al. | 203—73 X |
| 3,160,585 | 12/1964 | Emmett et al. | 203—7 X |
| 3,213,000 | 10/1965 | Ewing | 203—173 |
| 3,218,241 | 11/1965 | Checkovich | 203—7 |
| 3,248,181 | 4/1966 | Akimoto | 23—300 |

FOREIGN PATENTS 1,002,732  8/1965  Great Britain.

OTHER REFERENCES

"Flash Evaporators for the Distillation of Sea Water" by A. Frankel, pub. by The Institution of Mech. Engrs., 1 Birdcage Walk, Westminster, London, December 1959, page 10 and plates 1 and 2.

Badger, Ewing, and Frankel show series connected flash plants. Lyman is similar and additionally shows a heater preceding each plant.

Methods for Scale Control in Flash Evaporators (1965).

NORMAN YUDKOFF, *Primary Examiner.*

J. SOFER, *Assistant Examiner.*